(12) United States Patent
Wójtowicz et al.

(10) Patent No.: US 8,231,712 B2
(45) Date of Patent: Jul. 31, 2012

(54) CARBON-BASED SORBENT FOR GAS STORAGE, AND METHOD FOR PREPARATION THEREOF

(75) Inventors: Marek A. Wójtowicz, East Hartford, CT (US); Eric Rubenstein, Longmeadow, MA (US); Michael A. Serio, Sturbridge, MA (US)

(73) Assignee: Advanced Fuel Research, Inc., East Hartford, CT (US)

( * ) Notice: Subject to any disclaimer, the term of this patent is extended or adjusted under 35 U.S.C. 154(b) by 369 days.

(21) Appl. No.: 12/655,212

(22) Filed: Dec. 24, 2009

(65) Prior Publication Data

US 2010/0116136 A1    May 13, 2010

Related U.S. Application Data

(63) Continuation-in-part of application No. PCT/US2008/007948, filed on Jun. 26, 2008.

(60) Provisional application No. 60/937,893, filed on Jun. 29, 2007.

(51) Int. Cl.
*B01J 20/20* (2006.01)

(52) U.S. Cl. ........... 95/116; 95/903; 502/418; 502/420; 502/526

(58) Field of Classification Search .............. 95/90, 116, 95/900, 902; 96/108; 206/0.7; 423/648.1; 502/416, 418–420, 430, 432, 436, 526
See application file for complete search history.

(56) References Cited

U.S. PATENT DOCUMENTS

| | | | |
|---|---|---|---|
| 5,071,820 A | | 12/1991 | Quinn et al. |
| 5,292,706 A | * | 3/1994 | Chang et al. .................. 502/418 |
| 5,385,876 A | * | 1/1995 | Schwarz et al. ................ 502/80 |
| 5,626,650 A | * | 5/1997 | Rodriguez et al. .............. 95/116 |
| 5,993,766 A | * | 11/1999 | Tom et al. ...................... 423/294 |
| 6,290,753 B1 | * | 9/2001 | Maeland et al. ................. 95/116 |
| 6,626,981 B2 | | 9/2003 | Wójtowicz et al. |
| 2002/0020292 A1 | | 2/2002 | Wójtowicz et al. |
| 2004/0107838 A1 | | 6/2004 | Carruthers |
| 2006/0011064 A1 | | 1/2006 | Carruthers |
| 2011/0167530 A1 | * | 7/2011 | Wojtowicz et al. ................ 2/2.5 |

OTHER PUBLICATIONS

International Search Report Jan. 5, 2009.

* cited by examiner

*Primary Examiner* — Frank Lawrence, Jr.
(74) *Attorney, Agent, or Firm* — Ira S. Dorman

(57) ABSTRACT

The method enables control over carbon pore structure to provide sorbents that are particularly advantageous for the adsorption of specific gases. It involves preparation of a sorbent precursor material, carbonization of the precursor material, and, usually, activation of the carbonized material. The resultant material is subjected to heat treatment and/or to surface conditioning by a reducing gas at elevated temperatures.

26 Claims, 19 Drawing Sheets

CARBON-BASED SORBENT FOR GAS STORAGE, AND METHOD FOR PREPARATION THEREOF

CROSS REFERENCE TO RELATED APPLICATION

This application claims the benefit of U.S. Provisional Patent Application No. 60/937,893, filed Jun. 29, 2007, and is a continuation in part of International Application PCT/US08/07948 (Publication No. WO 2009/011750), filed 26 Jun. 2008, the entire specifications of which are hereby incorporated hereinto by reference thereto.

STATEMENT REGARDING GOVERNMENT INTEREST

The United States Government has rights in this invention under National Aeronautics and Space Administration contracts Nos. NAS9-97012, NNL06AA47P, and NAS1-03030.

BACKGROUND OF THE INVENTION

In many energy-storage systems, the volume available for gas storage is restricted and, indeed, can be a limiting factor for a given technology. For example, the acceptance of natural gas as a transportation fuel has been slow mainly due to the lower energy density of that gas as compared with gasoline. The same is true regarding hydrogen and hydrocarbons for the use in spacecraft propulsion systems and fuel cells. The storage of hydrogen is certainly a critical barrier that needs to be overcome before fuel cells can be widely used in transportation applications. Another gas-storage application is the transportation and handling of highly hazardous gases, e.g. those used in the semiconductor industry. Examples of such gases are phosphine ($PH_3$), boron trifluoride ($BF_3$), and arsine ($AsH_3$). Thus, there exists a strong need for the development of lightweight, compact, safe, and high energy density storage of gases for a variety of applications.

At present, there are two principal approaches to this problem: (a) physical storage (compressed gas, liquefaction, and adsorption); and (b) chemical storage (e.g., metal hydrides for hydrogen storage). The above state-of the art solutions have the following limitations. Compressed gas systems have high weight-to-volume ratios due to the heavy containers required for the storage of pressurized gas. Lightweight graphite composites show some promise in alleviating this difficulty but further advancements and product development are required to assure safe and reliable use of these materials. In addition, the transportation and storage of toxic gases in pressurized containers poses safety concerns associated with accidental tank rupture. Cryogenic storage carries with it significant penalties because of the energy required to liquefy the gas and to maintain it in a liquefied state. Metal hydrides, or other suitable chemicals, remain a possible option, but low-cost hydrides currently require high temperatures to liberate the stored hydrogen. The hydrides which are capable of liberating hydrogen at low temperatures have a very low storage capacity.

Gas storage based on adsorption on activated carbon offers large storage capacity in terms of weight (2-4 times greater than state-of-the-art hydrides). Activated and other carbons with significantly developed nanostructure have a great potential to provide substantially larger storage capacities than gas compression because the density of the adsorbed phase is greater than gas density. The high density of gas at the surface more than compensates some loss of the available volume associated with the introduction of a sorbent. In some cases, the subatmospheric storage of gas adsorbed on microporous sorbent can be more effective, and much safer, than the storage of the same gas in pressurized tanks. This is thanks to the extremely strong interactions between the adsorbed molecules and the walls of micropores (pore size, d<2 nm) present in the adsorbent. The high density of the adsorbed gas is accomplished through the use of monolithic sorbents, e.g. discs, containing mostly micropores, with only small amounts of mesoporosity (pore size, d=2-50 nm) and macroporosity (pore size, d>50 nm).

A key to successful gas-storage sorbents is the ability to "engineer" the pore structure in such a way so that only pores having optimum dimensions are formed. The optimum dimension will, generally speaking, be different for different gases, but the common features of good gas-storage sorbents are: (1) a large number of pores with a narrow pore-size distribution within the micropore region (pores smaller than 2 nm); (2) the absence of meso and macroporosity (pores larger that 2 nm); (3) the absence of voidage within the storage container, i.e., the sorbent has the form of monolithic elements, e.g., discs, rather than loosely packed particles; and (4) the absence of surface complexes, e.g., stable surface oxides, that may block active sites or impede gas diffusion into and out of the pore structure.

Innovative char-activation and pore-size control techniques have heretofore been developed to tailor the pore structure of carbon-based sorbents, as disclosed for example in Quinn and Holland U.S. Pat. No. 5,071,820, 1991, and Wójtowicz, Serio, and Suuberg, U.S. Pat. No. 6,626,981. Further advances in the art are needed however to optimize sorbent properties and performance.

SUMMARY OF THE INVENTION

Accordingly, the broad objects of the invention are to provide a methodology for implementing control over carbon pore structure, and to provide sorbents that are particularly advantageous for the adsorption of specific gases.

It has now been found that certain of the foregoing and related objects can be accomplished using a method for producing high capacity gas-storage microporous sorbents that comprises the following sequential steps, with at least one of the steps (d) and (e) being deemed essential to obtain good control over sorbent properties and performance: (a) preparation of sorbent precursor in the form of granular material or, preferably, monolithic elements, e.g., discs; (b) carbonization of the precursor material by heat-treatment in the absence of oxidizing atmospheres and, preferably, especially in the case of monolithic precursors, under low heating rate conditions to avoid excessive gas evolution, foaming, and mechanical damage to the sorbent; (c) activation of the carbonized material using any method, but preferably a cyclic chemisorption-desorption technique which consists of the following steps, repeated cyclically, as necessary, until an optimum gas-storage capacity is reached: (i) oxygen chemisorption on carbon surface at a relatively low temperature $T_{ch}$ for a period of $\tau_{ch}$ to form stable oxygen surface complexes; and (ii) desorption of the surface complexes at a high-temperature, $T_d$, in the absence of oxygen for a period $\tau_d$; (d) heat-treatment at elevated temperatures (about 800° C. to about 2,000° C.); and (e) surface conditioning by hydrogen, or other reducing gas, e.g. carbon monoxide, treatment at elevated temperatures (above about 300° C.).

Other objects of the invention are attained by the provision of sorbents produced by the foregoing method. The sorbents obtained are found to be particularly suitable for the following applications: (a) PH$_3$ storage; (b) BF$_3$ storage; (c) H$_2$ storage; and (d) gas storage applications in which high adsorptive diffusivity/permeability is required.

DETAILED DESCRIPTION OF THE PREFERRED EMBODIMENTS

Figure 1:
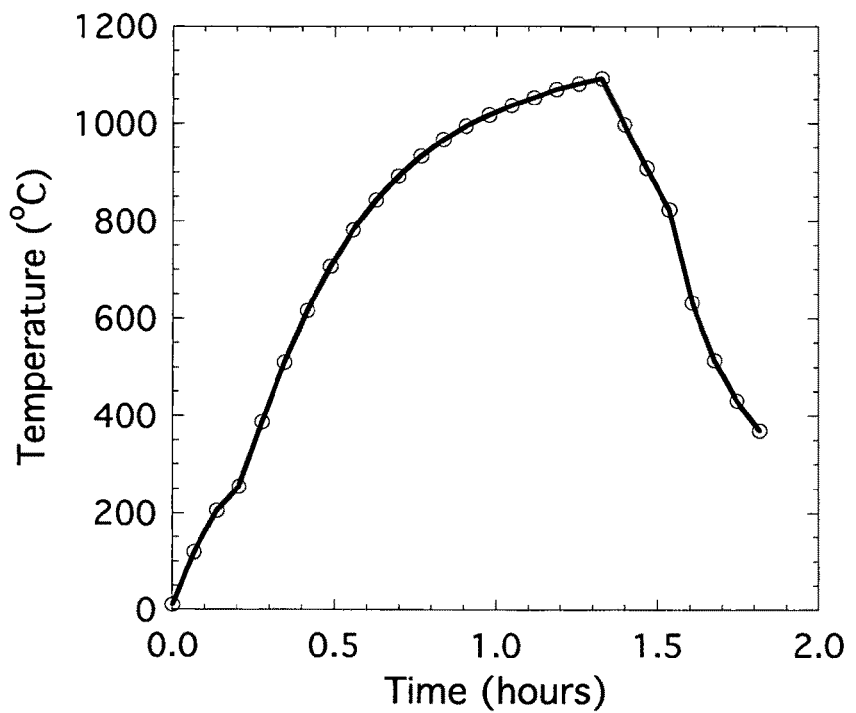
FIG. 1 is a graph showing the temperature profile used in the heat-treatment step employed in the preparation of samples AFR-3 and AFR-4.
Figure 2:
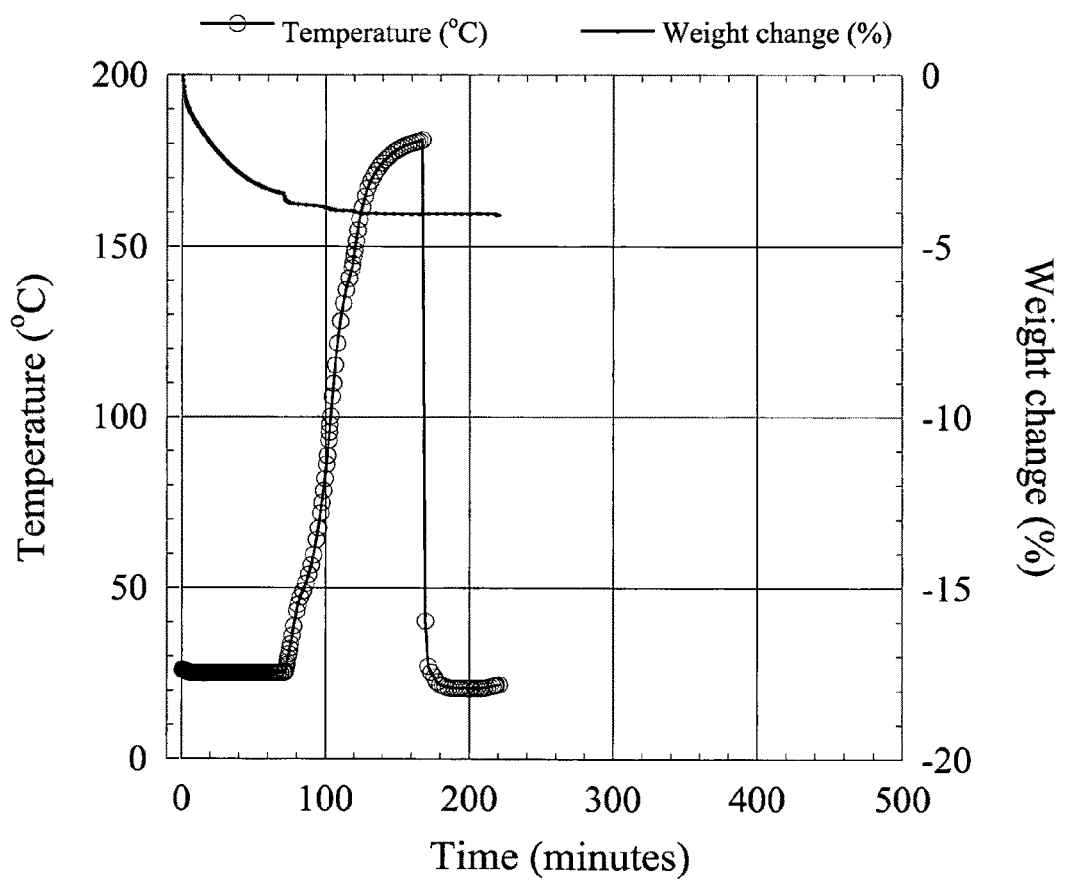
FIG. 2 is a graph of curves presenting thermogravimetric analysis (TGA) data on moisture loss upon drying for the reference sample. The data were collected under vacuum conditions.
Figure 3:
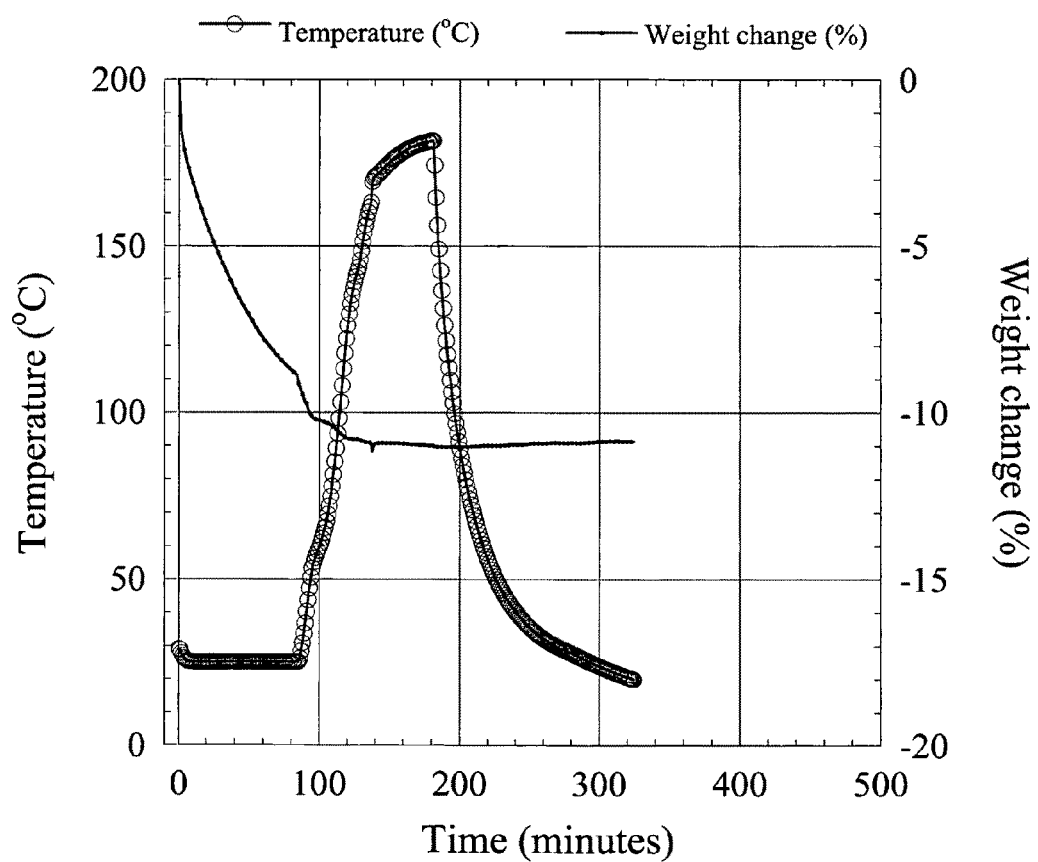
FIG. 3 is a graph of TGA data on moisture loss upon drying, with data collected under vacuum conditions, for sample No. AFR-1.
Figure 4:
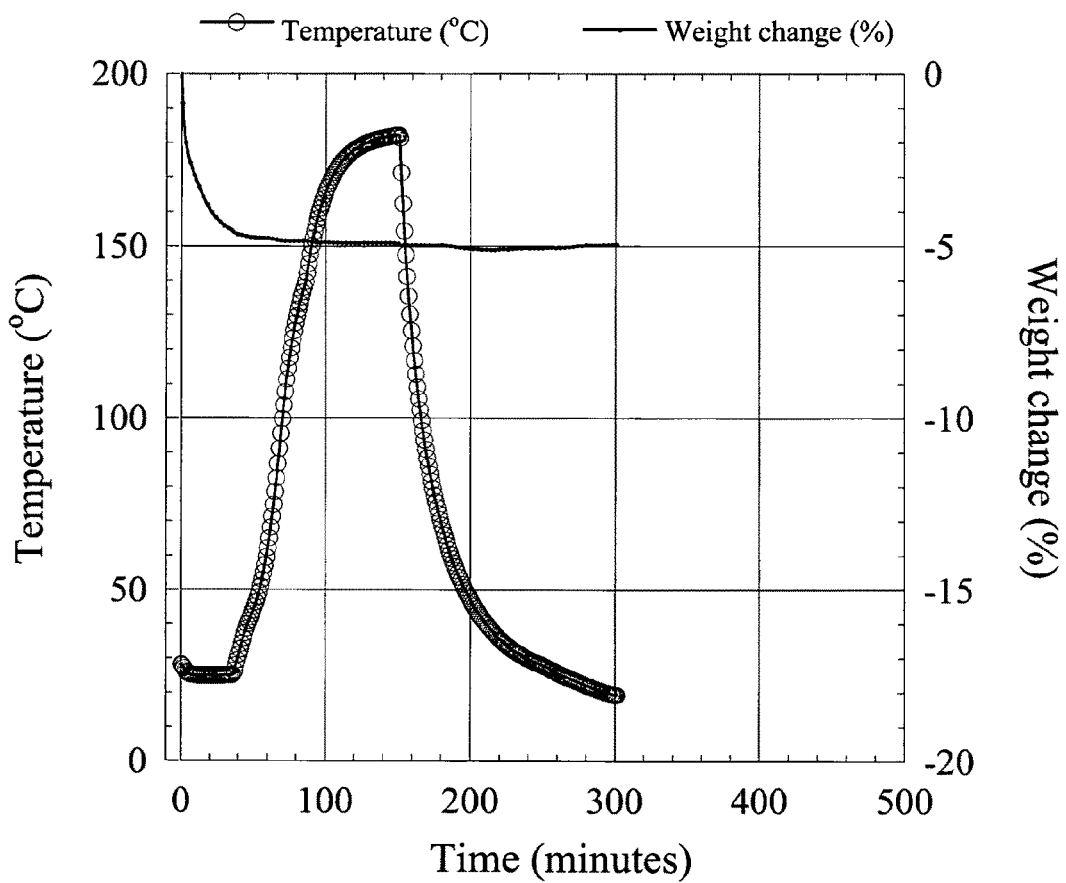
FIG. 4 is a graph of TGA data on moisture loss upon drying, with data collected under vacuum conditions, for sample No. AFR-2.
Figure 5:
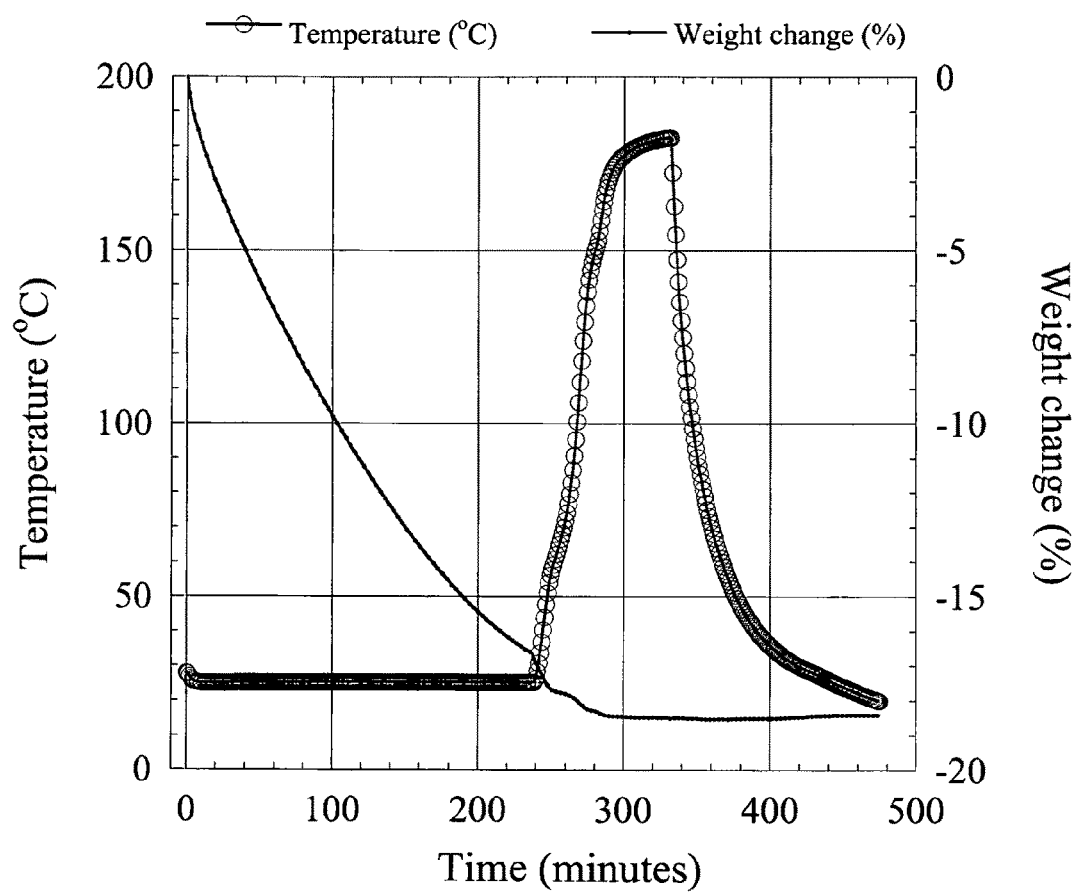
FIG. 5 is a graph of TGA data on moisture loss upon drying, with data collected under vacuum conditions, for sample No. AFR-3.
Figure 6:
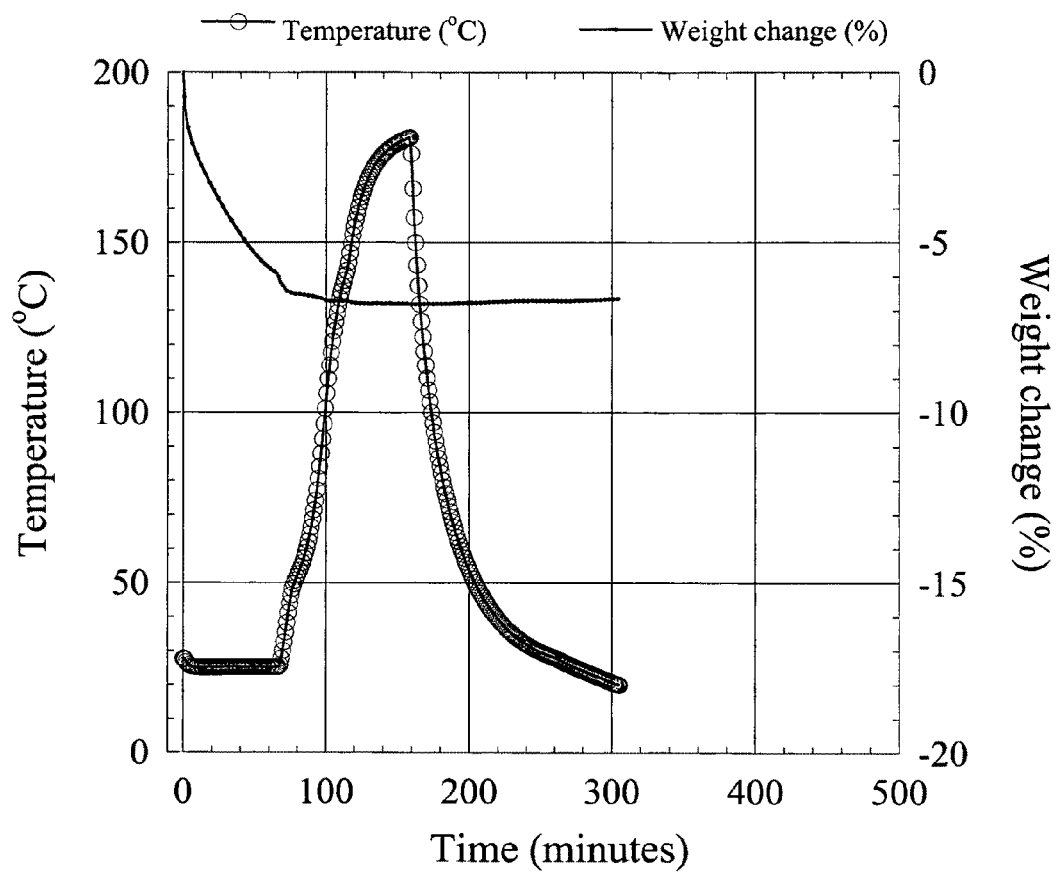
FIG. 6 is a graph of TGA data on moisture loss upon drying, with data collected under vacuum conditions, for sample No. AFR-4.
Figure 7:
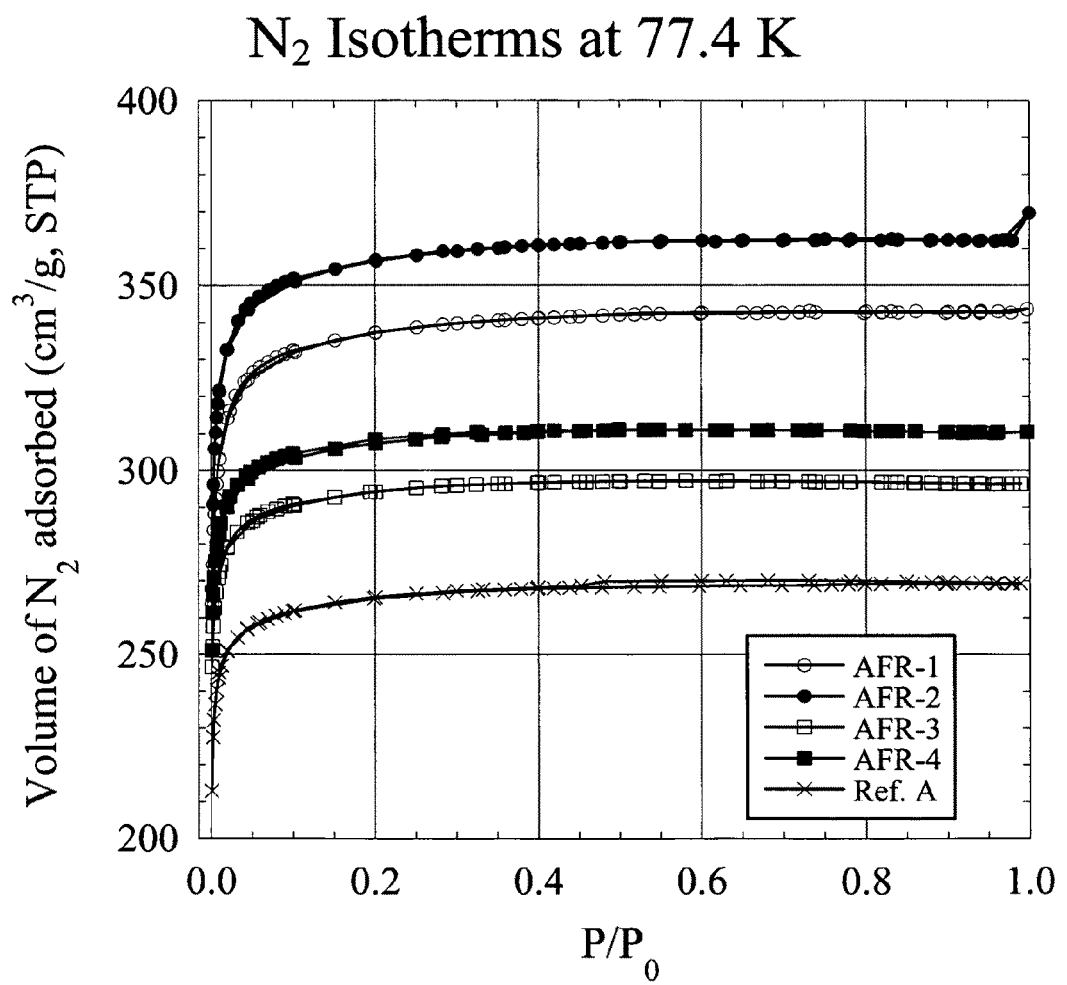
FIG. 7 is a graph presenting nitrogen adsorption isotherms at 77 K for samples AFR-1, AFR-2, AFR-3, AFR-4, and for the reference material.

An innovative sorbent-preparation technique, embodying the present invention, is summarized below:
1. carbonization (pyrolysis) of an organic precursor (often a polymer) to form pyrolysis char;
2. char activation using any method, but preferably the cyclic chemisorption-desorption techniques described in Quinn and Holland, U.S. Pat. No. 5,071,820, 1991, and in Wójtowicz, Serio, and Suuberg, U.S. Pat. No. 6,626,981;
3. heat treatment of carbon;
4. surface conditioning (hydrogen or carbon monoxide treatment at elevated temperatures).

Either or both of steps 3 and 4 must be carried out to implement improved control over the carbon pore structure, and thus to obtain optimal sorbent gas-storage performance.

A description of the sorbent-preparation technique used in the practice of the present invention, as well as the results of gas-sorption tests, are set forth below.

Starting Material

Although high-purity polyvinylidene chloride (PVDC) was used as a precursor for sorbent preparation, blends of PVDC and other organic materials can be used, with such blends containing at least 40% PVDC, and preferably at least 50% PVDC. Other materials (such as polyfurfuryl alcohol, phenolic resin, coconut shells, peach stones, etc.), pure or blended, are also possible as sorbent precursors, as will be evident to those skilled in the art. PVDC is particularly suitable, however, as it forms little or no mesoporosity upon carbonization (pyrolysis).

Pelletized or otherwise shaped (monolithic) sorbents are desirable for gas storage so that the excessive packed-bed voidage is reduced from ~40% (spheres of identical size) down to nearly zero in the case of carefully arranged, shaped sorbent elements. To study the sorption properties of monolithic carbon sorbents, a number of pellets were prepared by pressing the original polyvinylidene chloride (PVDC) powder in a tablet press. All pellets were approximately 12 mm in diameter and 6 mm thick. The objective of this work was to determine gas-sorption characteristics of several carbon samples prepared using the methodology that is the subject of this invention. The description of the four steps used in sample preparation is given below.

Carbonization of PVDC Monoliths (Pellets)

The objective of this part of the sorbent-preparation procedure was to carbonize the 12 mm size pellets that would eventually become a highly effective gas-storage sorbent. The initial challenge was to carbonize the PVDC without causing swelling and foaming of the sorbent material.

PVDC foaming is of great concern, as about 75 wt. % of the original material evolves as volatile species during pyrolysis (Walker, P. L., Jr., Austin, L. G. and Nandi, S. P., "Activated diffusion of gases in molecular-sieve materials," in *Chemistry and Physics of Carbon*, vol. 2 (P. L. Walker, Jr., Ed.), Marcel Dekker, Inc., New York, 1966, pp. 257-371). This fairly rapid release of gases is a direct cause of foaming, and monolith disruption, and slowing down the rate of gas evolution was expected to lead to reduced foaming. The following, very specific, pyrolysis regime was found ideal for the structural integrity of PVDC pellets:

1. Heat at 0.7° C./min for 116 min to 100° C.
2. Heat at 0.5° C./min for 130 min to 165° C.
3. Hold for 30 min at 165° C.
4. Heat at 0.1° C./min for 150 min to 180° C.
5. Hold for 30 min at 180° C.
6. Heat at 0.1° C./min for 200 min to 200° C.
7. Hold for 30 min at 200° C.
8. Heat at 0.1° C./min for 480 min to 248° C.
9. Heat at 0.5° C./min for 600 min to 548° C.
10. Heat at 5° C./min for 70 min to 900° C.
11. Hold for 3 min at 900° C.
12. Cool down to room temperature at no more than ~15° C./min.

The low-temperature steps, such as steps 1-8 above, are believed to be critical from the standpoint of gas evolution, which, under the above conditions, occurs slowly in the temperature range 170-230° C. It will be appreciated by those skilled in the art that heating rates somewhat different from the ones specified above can be successfully implemented, and that one or more temperature hold periods can (but need not necessarily) be used as part of the carbonization procedure. In general, the heating rates employed in the carbonization step should be well below 5° C./min. The range of temperatures to which the precursor material is heated during the slow carbonization process is usually between about 100° C. and 1,100° C.

It has been found that differences in PVDC carbonization temperature, or post-carbonization heat treatment, may lead to dramatic differences in char microstructure and, ultimately, also to differences in gas-storage performance. As discussed in U.S. Pat. No. 6,626,981, sorbent carbonized under severe conditions ($T_f$=1100° C. and $\tau_f$=30 min) showed a markedly better performance for hydrogen sorption than sorbents prepared under milder conditions ($T_f$=900° C. and $\tau_f$=5 min). Although the carbonization temperature itself can be used to affect sorbent characteristics, the severe conditions utilized in the above work often lead to the loss of carbon reactivity in the activation step. This causes problems with further processing of the sorbent, and for this reason, the heat-treatment step is implemented after, not before, the activation step in the method of this invention. This constitutes an important distinction between the present invention and U.S. Pat. No. 6,626,981.

Char Activation

The cyclic chemisorption-desorption method was used to further process the carbonized PVDC pellets, as described in the following patents: Quinn and Holland, U.S. Pat. No. 5,071,820, 1991, and Wójtowicz, Serio, and Suuberg, U.S. Pat. No. 6,626,981. In general, the following process parameters can be used: (1) chemisorption temperature, $T_{ch}$=150-250° C.; (2) chemisorption time, $\tau_{ch}$=15 min-50 hrs; (3) desorption temperature, $T_d$=700-1,000° C.; and (4) desorption time, $\tau_d$=1 min-2 hrs. Sorbent weight loss (burn-off) can be controlled by adjusting the number of chemisorption-desorption cycles. In general, at least one cycle is required, and the preferred carbon burn-off is between about 2 percent to about 30 percent. It should be appreciated that even a single cycle of chemisorption-desorption substeps can produce significant benefits in the sorbent product, although the preferred number of cycles is at least 5.

In the case of the PVDC carbons studied in connection with the present invention, 15 oxygen chemisorption-desorption cycles were used, and the process parameters were: $T_{ch}$=200° C.; $\tau_{ch}$=120 min; $T_d$=750° C.; and $\tau_d$=12 min. Air and helium were used in the chemisorption and desorption steps, respectively. The reactor was purged with helium at 200° C. for 45 minutes between each oxygen-chemisorption and thermal desorption step. The heating and cooling rates used in the desorption step were 30.5° C./min. The activation process was carried out in a 2-inch ID tube furnace, and the flow rates of air and helium were 700 cm$^3$/min and 850 cm$^3$/min, respectively.

It should be appreciated that the methodology of the present invention is not limited to the above carbon-activation method. In fact, it will be apparent to those skilled in the art that any suitable activation method can be used. In some unusual cases, it may be appropriate not to use the activation step, for example, if the carbonized precursor material already possesses an extensive pore structure. Although the PVDC carbon falls into the class of such materials, activation is usually advantageous, and the carbons used in this work were activated, as described above. It should also be appreciated that the heat-treatment and/or surface-conditioning steps that are the subject of this invention may greatly enhance sorbent properties and performance even in the case where no activation step is implemented.

Heat Treatment

The ordering of graphitic planes, which is associated with thermal annealing of carbon, may have important implications for gas storage. It is likely that gas molecules achieve extremely high storage densities in interplanar spaces if the dimensions of these spaces are such that they maximize gas-carbon interactions. In general, different heat-treatment regimes (temperatures and hold times), or the lack of the heat-treatment step altogether, may be appropriate for different adsorbates. It will be appreciated by those skilled in the art that the heat-treatment temperature is generally in the range of about 800° C. to about 2,000° C., and preferably in the range of about 900° C. to about 1,500° C. The optional hold time is usually up to 4 hours. In the preparation of sorbents embodying the invention, the temperature profile shown in FIG. 1 was used. The maximum heat-treatment temperature was about 1,100° C., and there was no hold time at this temperature.

Surface Conditioning (Reducing-Gas Treatment at Elevated Temperatures)

After carbonization, activation and, optionally, heat-treatment, carbon sorbents are subjected to reducing-gas treatment at elevated temperatures, generally in the range of about 300° C. to 1,100° C., preferably between about 450° C. and about 900° C., and most desirably at about 750° C. The reducing gas for surface conditioning can contain various concentrations of hydrogen, carbon monoxide, and other gases, and it preferably contains about 2 vol % hydrogen and about 98 vol % inert gas. The purpose of this step is to remove stable oxides present on the carbon surface that may be blocking active sites and hinder the diffusion of the adsorbate into and out of the pores. As indicated previously, the presence of the heat-treatment and/or surface conditioning steps after carbonization and activation constitutes the essence of the present invention. The samples used in this work were first thermally cleaned by heating to 900° C. in an inert atmosphere, and then exposed to an atmosphere of 2 vol % hydrogen and 98 vol % $N_2$ at 750° C. for four hours. In general, the optional thermal surface cleaning in an inert atmosphere performed prior to surface conditioning by exposure to a reducing gas can be implemented in the temperature range of about 700° C. to about 1,100° C., and most desirably at about 900° C.

Gas-Storage Systems

It will be appreciated by those skilled in the art that the sorbents prepared according to the present invention can be used as part of the gas-storage method comprising the following steps: (1) sorbent fabrication that involves precursor selection and preparation (preferably in the form of monolithic elements), carbonization, activation, if appropriate, heat treatment and/or heat conditioning; (2) cooling the sorbent to the desired temperature; (3) filling a gas-storage tank with the sorbent; and (4) introducing the gas to be stored into the tank.

Specific Samples Used in the Present Work

The following four monolithic carbon sorbents were prepared using the indicated steps, and the procedures described above:
1. AFR-1—carbonization+activation
2. AFR-2—carbonization+activation+surface conditioning
3. AFR-3—carbonization+activation+heat-treatment
4. AFR-4—carbonization+activation+heat-treatment+surface conditioning
5. Ref. A—a reference sorbent (carbonization only)

The reference sorbent Ref. A was prepared conventionally, using a similar PVDC-based precursor and similar carbonization conditions.

Results of the Gas-Storage Performance Testing

Gas adsorption and desorption testing was performed using the equipment described below.

Gaseous hydride adsorption measurements were obtained up to 0.1 MPa pressure and at 294.3 K using a modified Micromeritics ASAP 2405 porosimeter, replacing the supplied vacuum pump with an Adixen MDP 5011 Molecular Drag Pump and an Adixen Pascal 2005C1 Rotary Vane roughing pump vented to a Metron Technologies Novapure® S520 dry scrubber. Delivery of the hazardous gases under pressure to the porosimeter was achieved via a gas manifold with pneumatic isolation valves actuated by a Honeywell Zellweger Analytics MDA TLD-1 Toxic Gas Detector. Nitrogen and hydrogen measurements at 77.4 K and up to 0.1 MPa were obtained via the ASAP 2405.

Gaseous inorganic fluoride adsorption measurements, again up to 0.1 MPa pressure and at 294.3 K, were obtained using a VTI Corp. GHP-300 Gravimetric Magnetic Suspension Balance and a gas delivery manifold with certain isolation valves actuated by a Honeywell Zellweger Analytics MDA TLD-1 Toxic Gas Detector. High vacuum was achieved via an Adixen turbo-molecular drag pump ATH31C with ACT201H controller backed up by an ACP28G dry roughing pump each vented to an Metron Technologies Novapure® S451D dry scrubber.

Experimental results are reported in FIG. 1 through FIG. 19 and Table 1 through Table 6. The salient observations and conclusions are set forth below. Albeit there is thought to be no ambiguity, it should perhaps be noted that samples AFR-1, AFR-2, AFR-3, and AFR-4 are sometimes referred to as samples Nos. 1 through 4.

1. The density of activated carbon monoliths (AFR-1 and AFR-2) is lower than the density of the unactivated reference sample Ref. A (see Table 1). This is to be expected, because activation increases the pore volume. With heat-treatment (AFR-3 and AFR-4), sample density increases because heat-treatment leads to pore narrowing and carbon shrinkage.

TABLE 1

The estimated monolith densities for samples AFR-1, AFR-2, AFR-3, AFR-4, and for the reference material.

| Sample | Density (g/ml) |
|---|---|
| AFR-1 | 0.894 |
| AFR-2 | 0.815 |
| AFR-3 | 1.18 |
| AFR-4 | 1.04 |
| Ref. A | 1.11 |

2. Activated carbon samples (e.g., AFR-1) adsorb more moisture than unactivated carbon (Ref. A) due to the increased pore volume caused by activation. This results in a higher moisture loss upon heating for activated carbons (compare, for example FIG. 2 with FIG. 3).

3. High adsorptive diffusivity (permeability) is obtained upon surface conditioning by exposure to hydrogen (compare FIG. 3 with FIG. 4, and compare FIG. 5 with FIG. 6; see also Table 2). AFR-2 appears particularly attractive in applications where high diffusivity is required. Longer outgas times for heat-treated samples (AFR-3 and AFR-4) are consistent with the pore narrowing caused by heat-treatment (see Table 2).

TABLE 2

TGA data on moisture loss upon drying for samples AFR-1, AFR-2, AFR-3, AFR-4, and for the reference material.

| Sample | Room-Temp. Outgas Time (min) | Weight Loss at 180° C. (wt %) |
|---|---|---|
| AFR-1 | 86 | 10.9 |
| AFR-2 | 37 | 4.9 |
| AFR-3 | 240 | 18.4 |
| AFR-4 | 67 | 6.6 |
| Ref. A | 72 | 4.02 |

TABLE 3

Pore-structure characteristics derived from nitrogen adsorption isotherms at 77K for samples AFR-1, AFR-2, AFR-3, AFR-4, and for the reference material.

| | AFR-1 | AFR-2 | AFR-3 | AFR-4 | Ref. A |
|---|---|---|---|---|---|
| BET surface area (m$^2$/g) | 1,339 | 1,417 | 1,171 | 1,227 | 1,014 |
| t-plot micropore volume (ml/g) | 0.497 | 0.526 | 0.439 | 0.460 | 0.378 |
| Horvath-Kawazoe slit size (nm) | 0.78 | 0.76 | 0.78 | 0.77 | 0.77 |
| Dubinin-Astakhov micropore volume (ml/g) | 0.541 | 0.554 | 0.462 | 0.481 | 0.386 |
| Dubinin-Astakhov E$_o$ (kJ/mol) | 26.6 | 22.1 | 30.7 | 27.1 | 18.4 |
| Dubinin-Astakhov Exponent | 1.77 | 2.48 | 1.93 | 2.15 | 3.39 |

$E_0$ is the Dubinin-Astakhov characteristic energy, and the Dubinin-Astakhov exponent was obtained by fitting the Dubinin-Astakhov equation to experimental data and looking for the most linear fit.

4. Activated samples have higher N$_2$-adsorption capacities, pore volumes, and surface areas than the unactivated reference sample (see FIG. 7 and Table 3). Again, heat-treatment leads to pore tightening and lowering of the above-listed characteristics (compare samples AFR-3 and AFR-4 with samples AFR-1 and AFR-2). Also, hydrogen-treatment increases N$_2$-adsorption capacity, pore volume, and surface area thanks to the removal of surface oxides (compare AFR-2 with AFR-1, and compare AFR-4 with AFR-3). It will be appreciated that the Horvath-Kawazoe analysis does not capture differences between the samples, but the Dubinin-Astakhov analysis does. The Dubinin-Astakhov parameter $E_0$ (characteristic energy) is known to increase as the pore size (slit size) decreases, and this relationship is described by the Stoeckli formula: $d=10.8/(E_0-11.4)$, where d is the slit size in nanometers and $E_0$ is the characteristic energy in kJ/mol. The Dubinin-Astakhov exponent is related to the width of pore-size distribution;

i.e., the higher the exponent, the narrower the pore-size distribution. It can be seen from Table 3 that, as expected, char activation leads to widening of not only the pores, but also their distribution (compare each of samples AFR-1, AFR-2, AFR-3, and AFR-4 with sample Ref. A).

Figure 8:
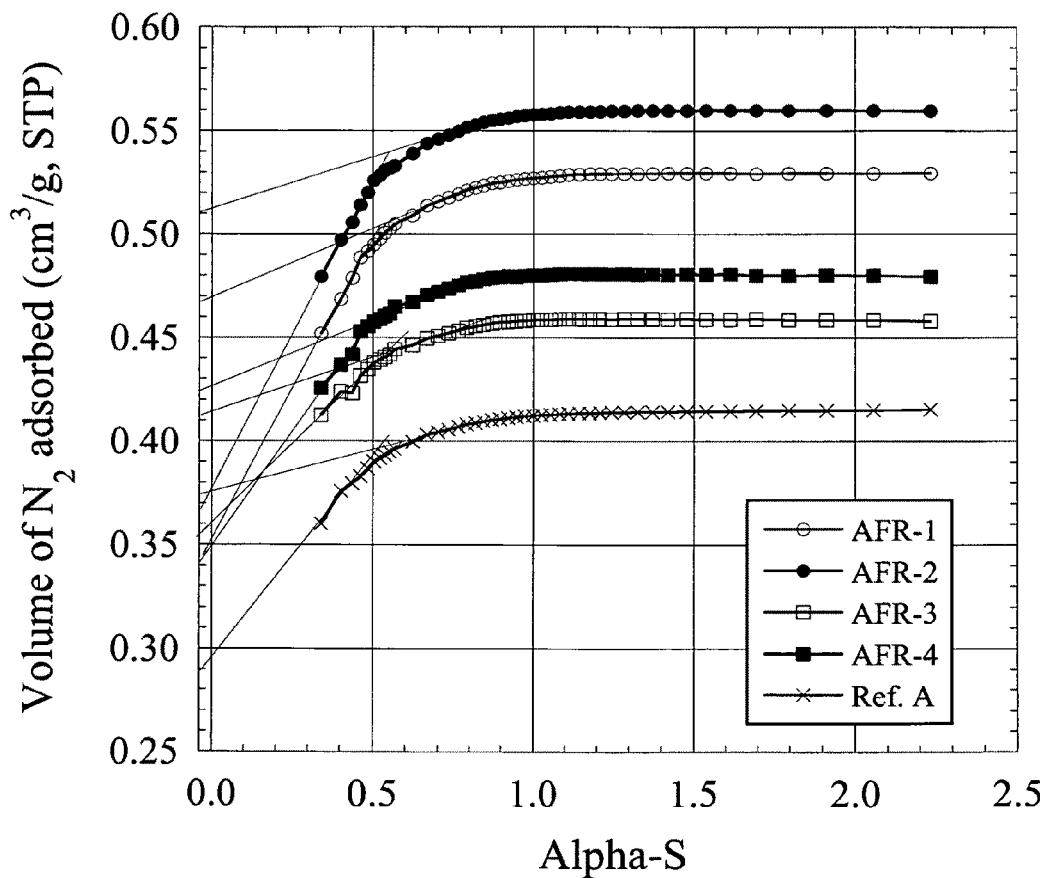
FIG. 8 is a graph presenting alpha-S analyses based on nitrogen adsorption isotherms at 77 K for samples AFR-1, AFR-2, AFR-3, AFR-4, and for the reference material.
Figure 9:
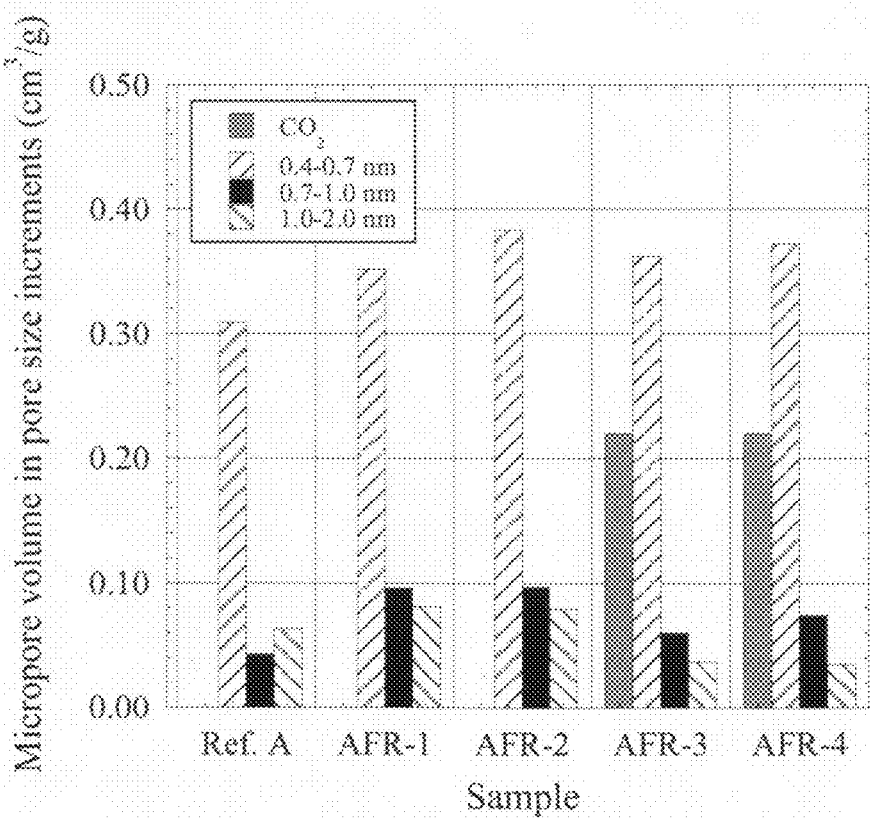
FIG. 9 is a bar graph presenting alpha-S analyses based on nitrogen adsorption isotherms at 77 K for samples AFR-1, AFR-2, AFR-3, AFR-4, and for the reference material, plus certain CO$_2$ interpolations.

5. Data in FIG. 8 and FIG. 9 show that both ultramicropores (d<0.7 nm) and supermicropores (0.7 nm<d<2.0 nm) exist in all samples.

Figure 10:
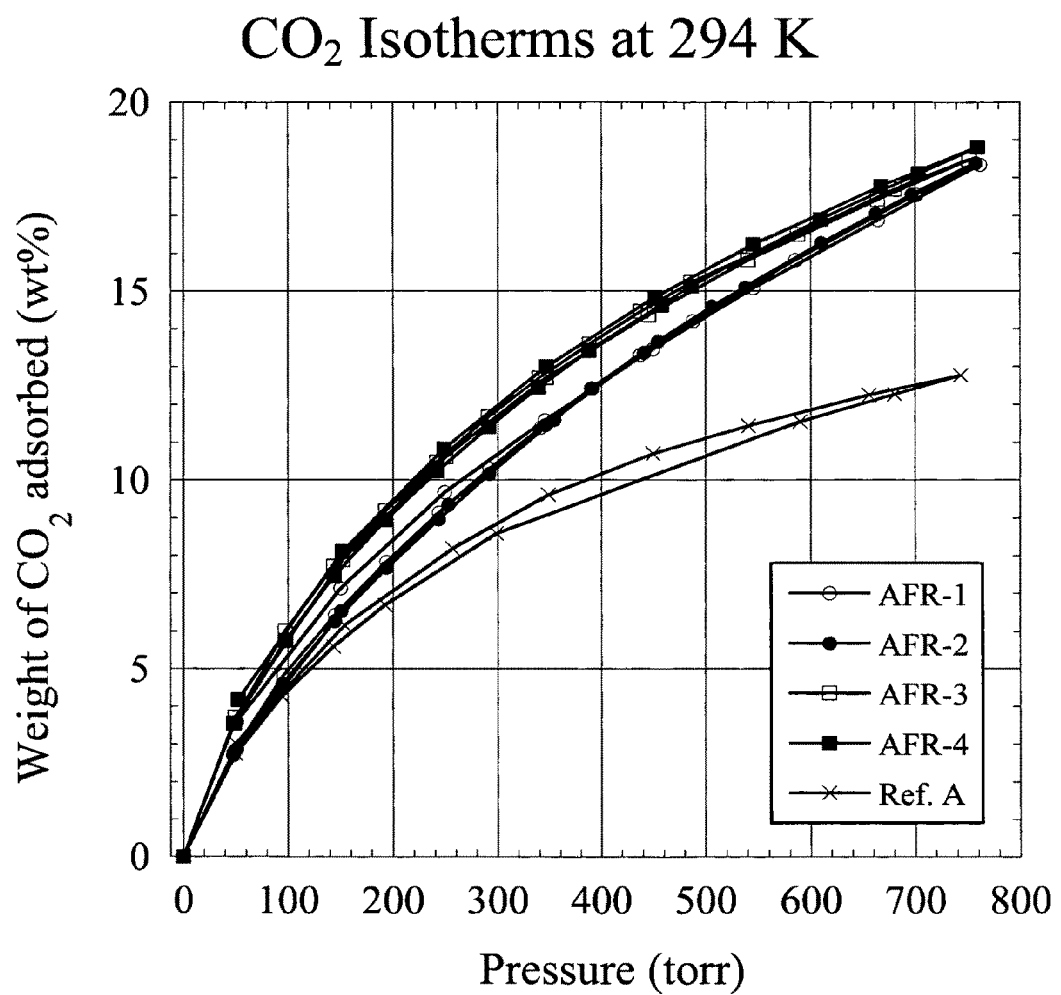
FIG. 10 is a graph presenting carbon dioxide adsorption isotherms at 294 K for samples AFR-1, AFR-2, AFR-3, AFR-4, and for the reference material.
Figure 11:
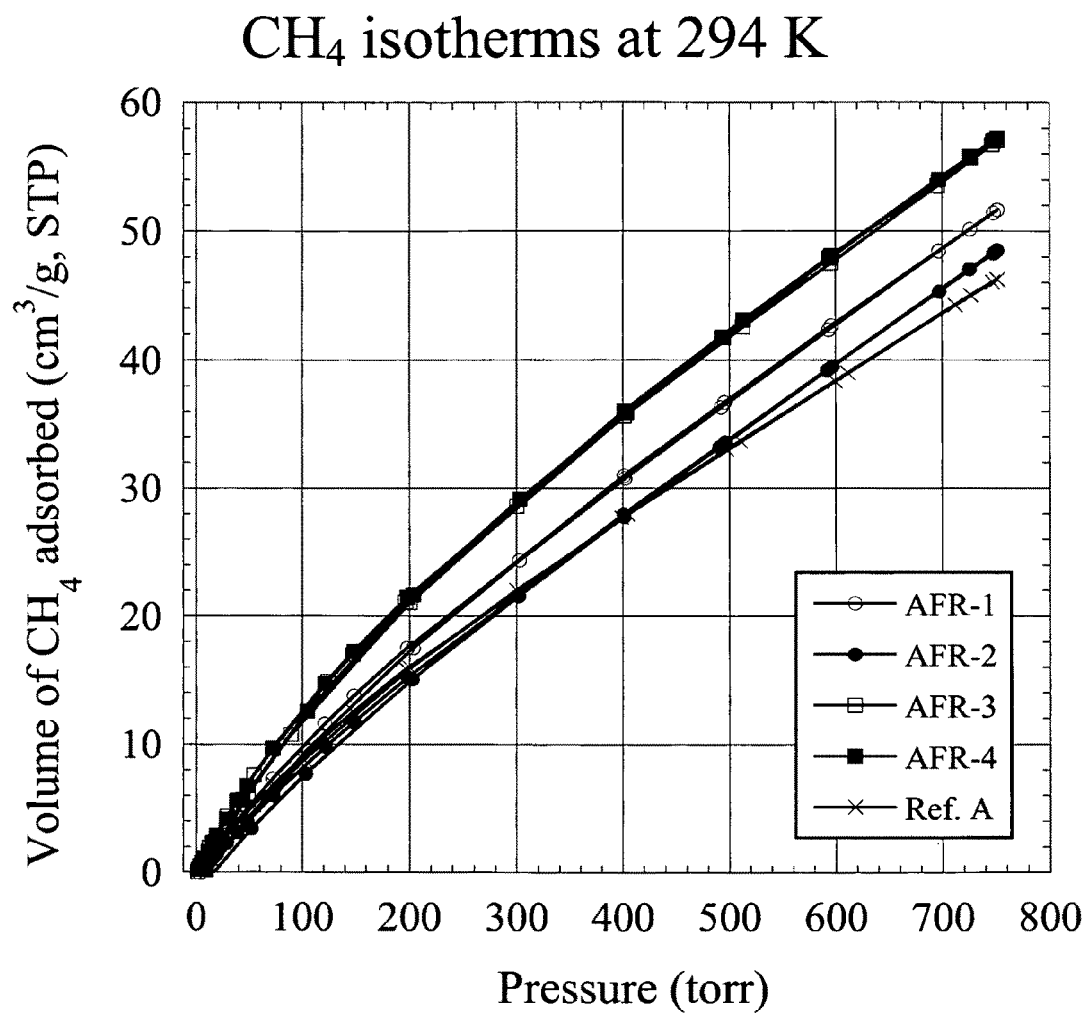
FIG. 11 is a graph presenting methane adsorption isotherms at 294 K for samples AFR-1, AFR-2, AFR-3, AFR-4, and for the reference material.

6. The $CO_2$ adsorption isotherms shown in FIG. 10 are very different from the $N_2$ adsorption isotherms shown in FIG. 7. This is most likely due to the faster diffusion of $CO_2$ through the tight pore structure at 294 K than the diffusion of $N_2$ at 77 K. The samples can be arranged in the order of increasing $CO_2$ sorption capacity as follows: Ref. A, AFR-1, AFR-2, AFR-3 and AFR-4. The last sample clearly has a lot of small pores, and all activated sorbents perform markedly better than the reference. Sample AFR-2 has much more porosity than sample AFR-1, which is due to the surface-oxide removal by hydrogen treatment in AFR-2.

7. The carbon-dioxide adsorption isotherms, shown in FIG. 10, and methane adsorption isotherms, shown in FIG. 11, allow one to distinguish between samples AFR-3 and AFR-4 versus AFR-2, most likely due to the different molecular size and geometry of the diffusing species ($CO_2$ versus $CH_4$).

Figure 12:
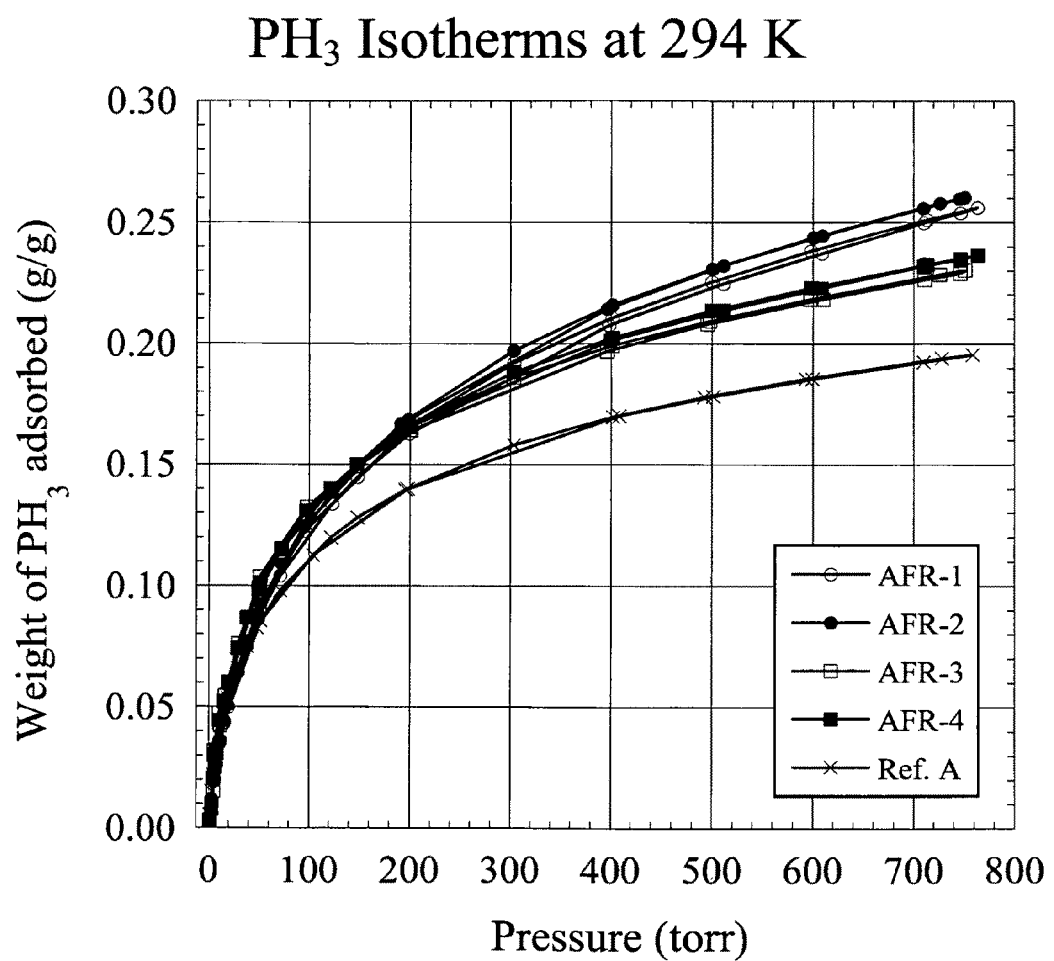
FIG. 12 is a graph presenting phosphine adsorption isotherms at 294 K for samples AFR-1, AFR-2, AFR-3, AFR-4, and for the reference material.
Figure 13:
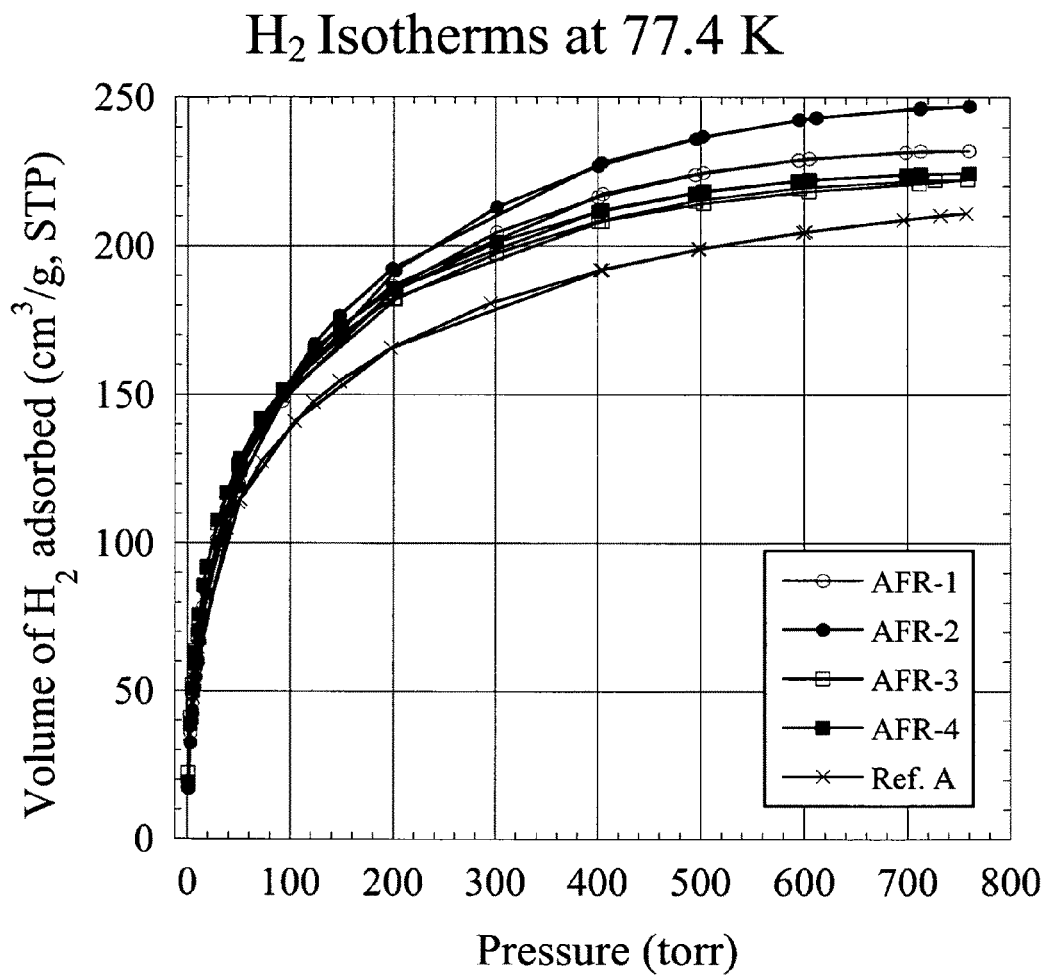
FIG. 13 is a graph presenting hydrogen adsorption isotherms at 77 K for samples AFR-1, AFR-2, AFR-3, AFR-4, and for the reference material.
Figure 14:
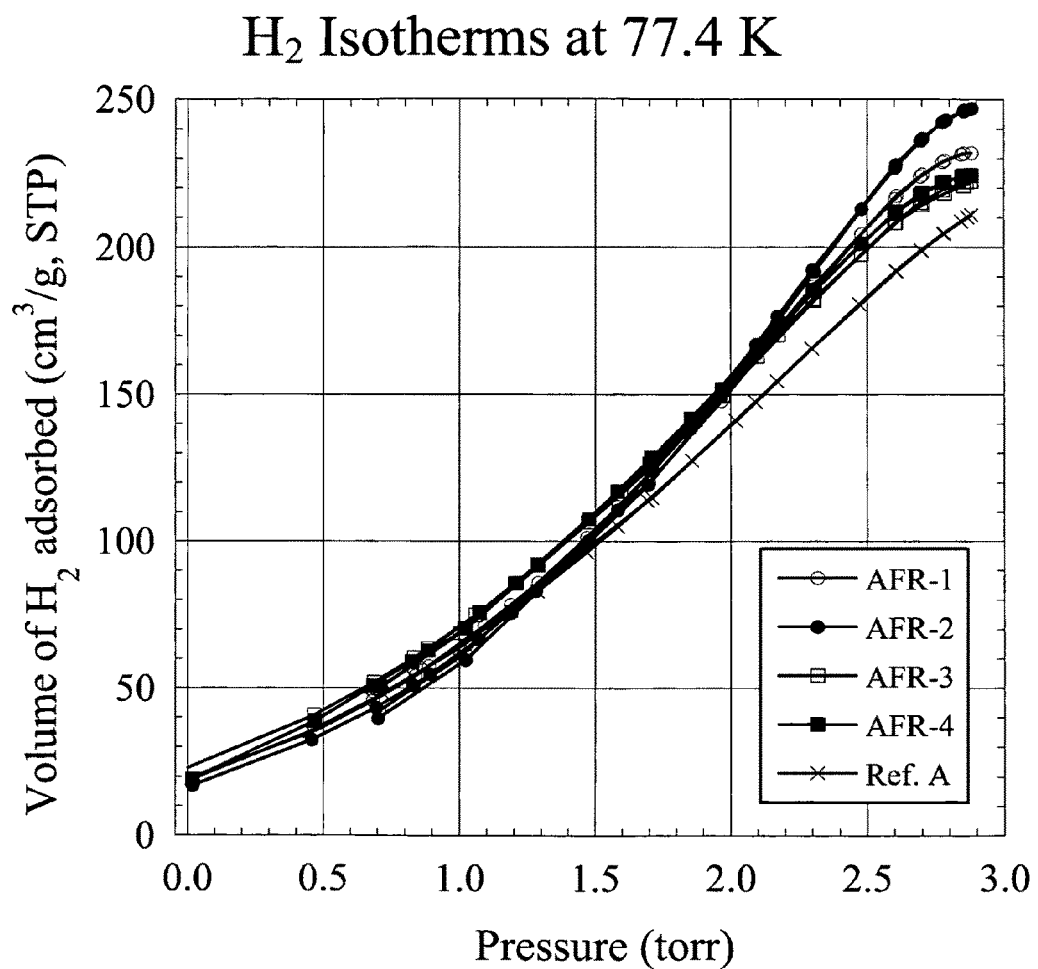
FIG. 14 is a graph presenting hydrogen adsorption isotherms at 77 K for samples AFR-1, AFR-2, AFR-3, AFR-4, and for the reference material, using a logarithmic scale.
Figure 15:
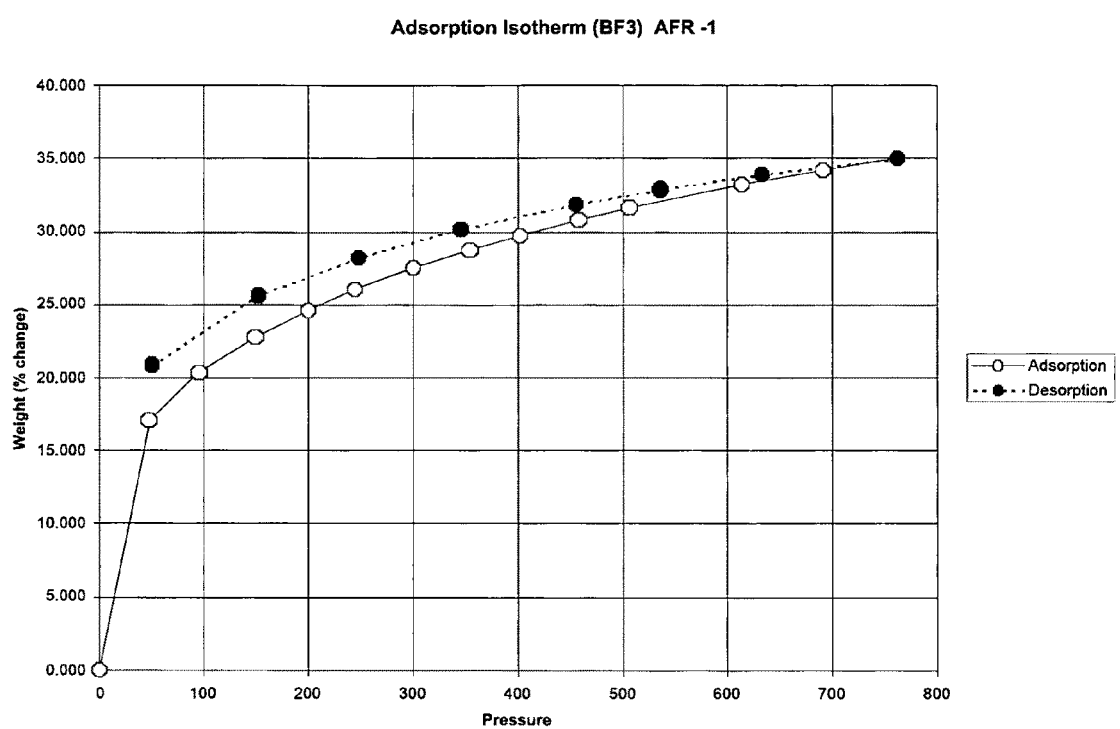
FIG. 15 is a graph presenting boron trifluoride adsorption and desorption isotherms at 294 K for sample AFR-1.
Figure 16:
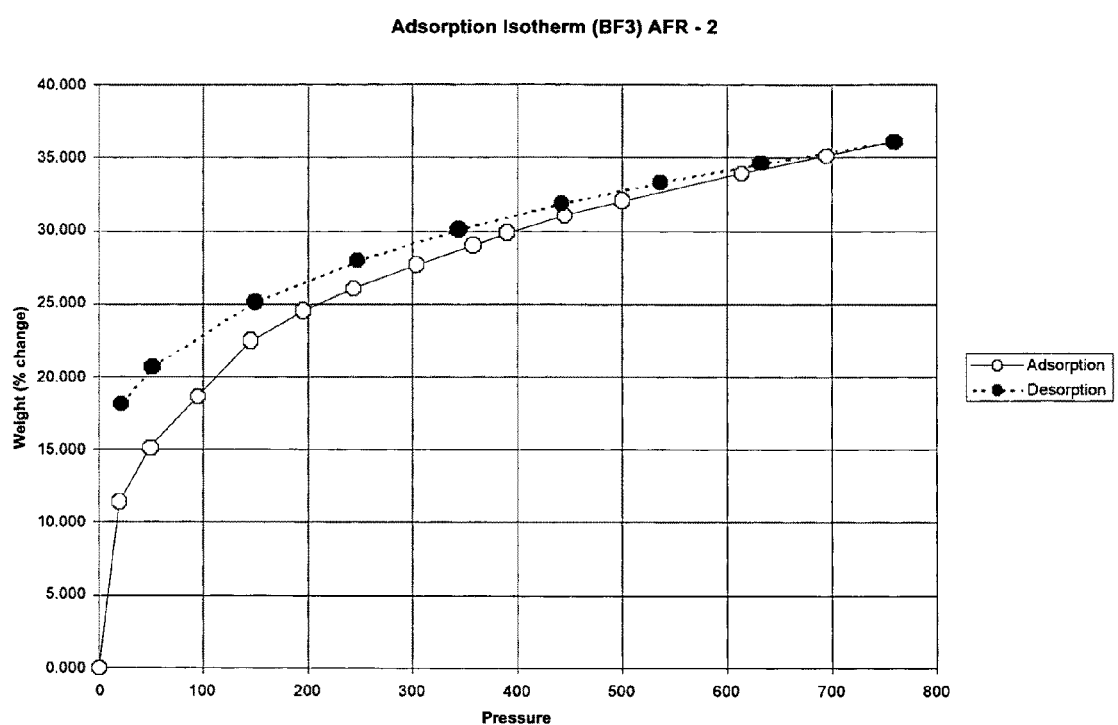
FIG. 16 is a graph presenting boron trifluoride adsorption and desorption isotherms at 294 K for sample AFR-2.

8. $PH_3$ adsorption isotherms shown in FIG. 12 are somewhat similar to $N_2$ adsorption isotherms, except the latter ones are Type I, and the former isotherms are Type II. $PH_3$ sorption on the heat-treated samples AFR-3 and AFR-4 seem to be inhibited by the molecular geometry of the diffusing molecule.

9. Some $H_2$ adsorption isotherms shown in FIG. 13 and FIG. 14 cross one another, which means that different sorbents may perform better or worse in different ranges of relative pressure.

10. The comparison of $BF_3$ adsorption for the AFR-1 sorbent with that for the reference leads to the following observations (compare FIG. 15 with FIG. 19): (a) the initial rapid uptake is significantly higher for AFR-1 than for the reference (17% versus 12%), followed by a tight fit into small pores for AFR-1; (b) a higher adsorption capacity for AFR-1 versus the reference (35% versus 31%).

11. The initial $BF_3$ uptake for AFR-2 (shown in FIG. 16) is lower than for AFR-1 (shown in FIG. 15).

Figure 17:
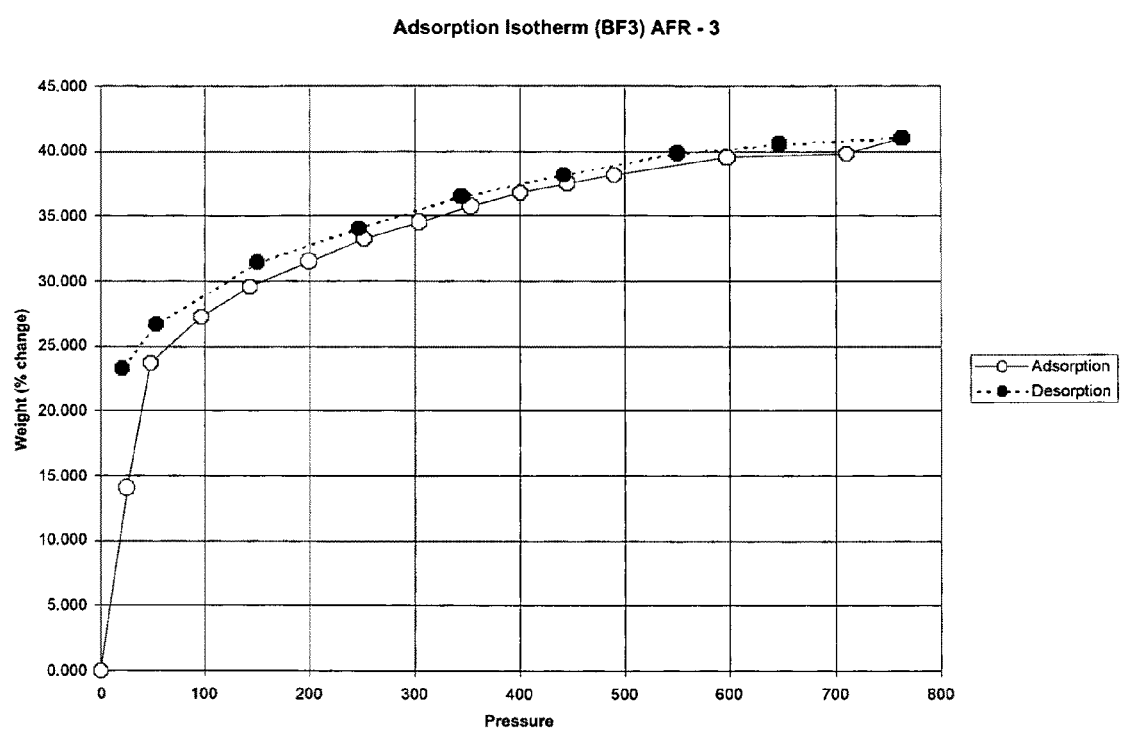
FIG. 17 is a graph presenting boron trifluoride adsorption and desorption isotherms at 294 K for sample AFR-3.
Figure 18:
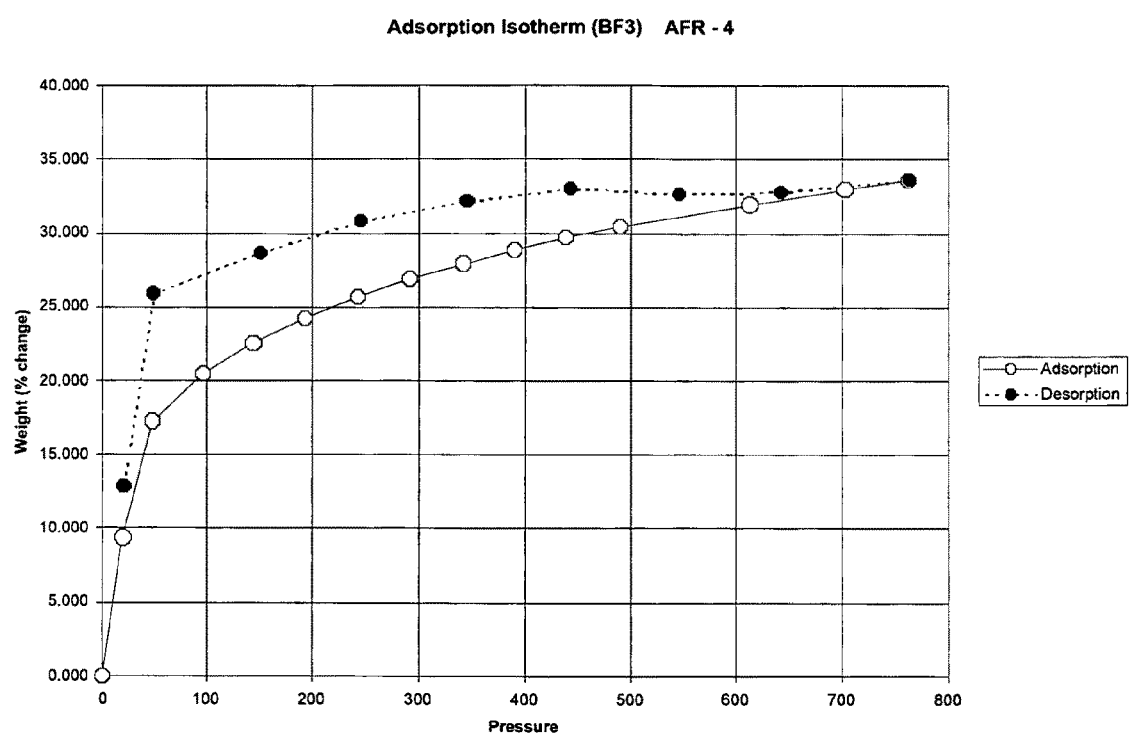
FIG. 18 is a graph presenting boron trifluoride adsorption and desorption isotherms at 294 K for sample AFR-4.
Figure 19:
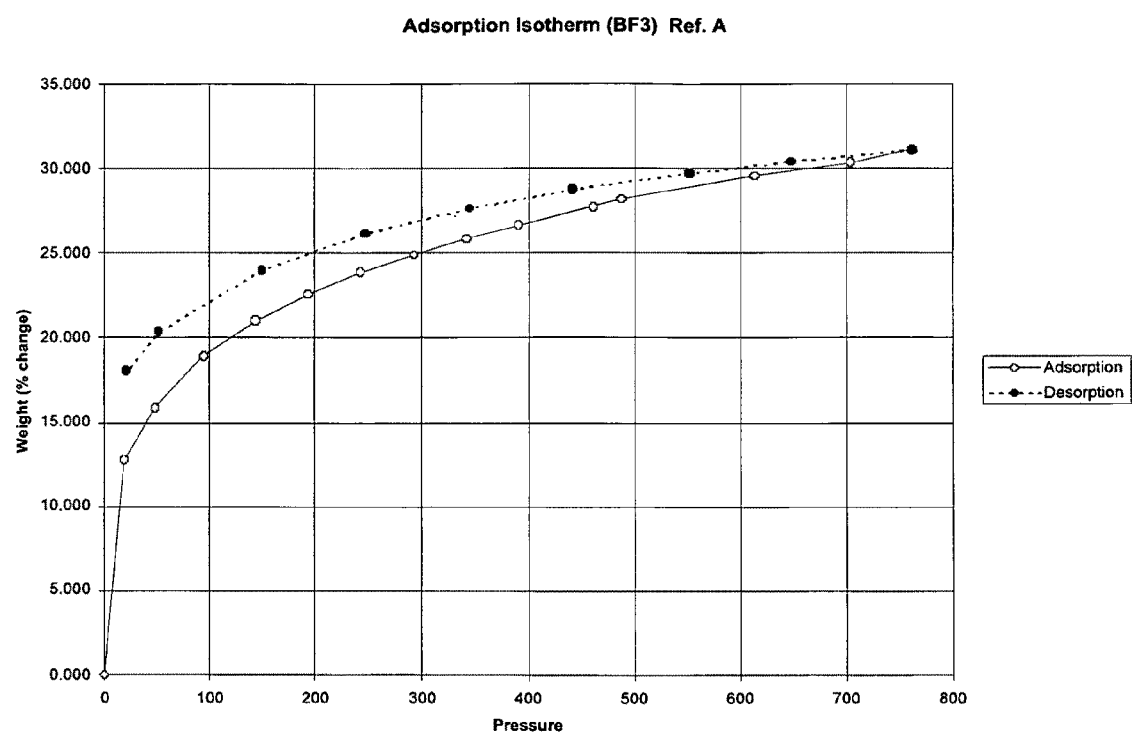
FIG. 19 is a graph presenting boron trifluoride adsorption and desorption isotherms at 294 K for the reference material (Ref. A).

12. As shown in FIG. 17, the initial $BF_3$ uptake for AFR-3 is exceptionally high (24%), and the secondary uptake and the desorbed amount are the highest among all the sorbents studied (41%−24%=17%).

13. $BF_3$-sorption data for AFR-4 (FIG. 18) show an extremely high amount of deliverable $BF_3$ (34%−13%=21%), if the last point of the desorption isotherm is taken into consideration. Furthermore, there is a good initial uptake, and the shape of the desorption isotherm and its hysteresis indicate that $BF_3$ is squeezed into very small pores.

14. Data in Table 4 show that heat-treatment without surface treatment by hydrogen (AFR-3) produces the best results for $PH_3$ storage, although the inclusion of surface treatment still produces a sorbent (AFR-4) that is superior to the reference material.

15. Data in Table 5 show that all disclosed sorbents embodying the invention have good $PH_3$ diffusivity characteristics as compared with the reference material.

16. Data in Table 6 show that heat-treatment with surface treatment by hydrogen (AFR-4) produces the best results for $BF_3$ storage. (There is a significantly higher initial-loss penalty of 101% in the case of the AFR-3 sorbent.)

TABLE 4

Phosphine ($PH_3$) sorption capacities for a cylinder having an average carbon load of 2,318 ml.

| Sample | $PH_3$ Fill Density (g/g) | $PH_3$ Fill Capacity (g) | $PH_3$ 650-20 torr Deliverables (g) |
|---|---|---|---|
| Ref. A | 0.189 | 482 | 352 |
| AFR-1 | 0.243 | 503 (4%) | 400 (14%) |
| AFR-2 | 0.250 | 472 (−2%) | 379 (8%) |
| AFR-3 | 0.222 | 607 (26%) | 439 (25%) |
| AFR-4 | 0.227 | 546 (13%) | 405 (15%) |

Data in parentheses indicate relative performance with respect to the reference material (Ref. A). The amount of phosphine delivered is for the case of venting the tank from 650 torr to 20 torr. The fill capacity is for a pressure of 650 torr.

TABLE 5

Phosphine ($PH_3$) diffusivity data within the sorbent pore structure.

| Sample | Time for Full Isotherm (hrs:min) |
|---|---|
| Kureha Reference | 5:17 |
| Kureha 'B' Reference | 7:12 |
| Ref. A | 11:31 |
| AFR-1 | 4:25 |
| AFR-2 | 4:16 |
| AFR-3 | 5:59 |
| AFR-4 | 6:18 |

The time given in the table is the combined time of the adsorption and desorption steps.

TABLE 6

Boron trifluoride ($BF_3$) sorption capacities for a cylinder having an average carbon load of 2,318 ml.

| Sample | $BF_3$ Fill Density (g/g) | $BF_3$ Fill Capacity (g) | $BF_3$ 650-20 torr Deliverables (g) |
|---|---|---|---|
| Ref. A | 0.218 | 552 | 295 |
| AFR-1 | 0.339 | 702 (27%) | 391 (33%) |
| AFR-2 | 0.346 | 653 (18%) | 310 (5%) |
| AFR-3 | 0.406 | 1,110 (101%) | 473 (60%) |
| AFR-4 | 0.328 | 789 (43%) | 479 (62%) |

Data in parentheses indicate relative performance with respect to the reference material (Ref. A). The amount of boron trifluoride delivered is for the case of venting the tank from 650 torr to 20 torr. The fill capacity is for a pressure of 650 torr.

In summary, the following conclusions can be drawn:

Significant diffusivity improvement is achieved in sample AFR-2 (carbonization+activation+surface conditioning), but at the cost of lower density.

Significant $PH_3$ capacity and deliverables are achieved in AFR-3 (carbonization+activation+heat treatment).

Significant $BF_3$ capacity and deliverables are achieved in sample AFR-4 (carbonization+activation+heat treatment+surface conditioning).

AFR-4 (carbonization+activation+heat treatment+surface conditioning) would provide the best $H_2$ storage capacity on a per-volume basis (high $H_2$ adsorption and high sorbent density).

AFR-2 (carbonization+activation+surface conditioning) might have application where high adsorptive diffusivity/permeability is required.

Gas sorbents obtained as a result of the method described are found to be particularly suitable for the following applications:

a) Application: $PH_3$ storage
   Sorbent: steps (a), (b), (c), and (d), as described hereinabove b) Application: $BF_3$ storage
   Sorbent: steps (a), (b), (c), (d), and (e), as described hereinabove c) Application: H$_2$ storage
   Sorbent: steps (a), (b), (c), (d) and (e) as described hereinabove
d) Application: gas storage, where high adsorptive diffusivity/permeability is required
   Sorbent: steps (a), (b), (c), and (e) as described hereinabove.

Having thus described the invention, what is claimed is:

1. A method for the production of carbon-based sorbents for gas storage, comprising the following steps, carried out in the order set forth:
   a) providing a sorbent precursor material that is subject to carbonization and activation;
   b) effecting carbonization of said sorbent precursor material by heat-treatment in a non-oxidizing atmosphere;
   c) effecting activation of the carbonized sorbent precursor material using any suitable method;
   d) effecting heat-treatment of said carbonized sorbent precursor material at a temperature in the range of about 800° C. to about 2,000° C.; and
   e) conditioning the surface of said heat-treated sorbent precursor material by contacting said surface with a reducing gas.

2. The method of claim 1 wherein, in said carbonization step (b), said sorbent material is heated to at least one desired temperature above 100° C. at a heating rate that is greater than zero and less than 5° C./minute, and optionally holding said material at said desired temperature for a period of at least 30 minutes.

3. The method of claim 1 wherein the said sorbent precursor material comprises at least about 40 percent by weight of polyvinylidene chloride.

4. The method of claim 1 wherein said activation step (c) employs a chemisorption-desorption technique consisting of the following subset of steps, carried out through at least one cycle and repeated cyclically, as necessary, to produce a desired gas-storage capacity in the sorbent:
   i) oxygen chemisorption on a carbonized surface of said sorbent precursor material at a relatively low temperature $T_{ch}$ for a period $\tau_{ch}$, to form stable oxygen surface complexes; and
   ii) desorption of said surface complexes at a high-temperature, $T_d$, in the absence of oxygen, for a period $\tau_d$.

5. The method of claim 4 wherein the process parameters for said activation step (c) have the following values: $T_{ch}$ is about 150° C. to about 250° C.; $\tau_{ch}$ is about 15 minutes to about 50 hours, $T_d$ is about 700° C. to about 1,000° C., and $\tau_d$ is about 1 minute to about 2 hours.

6. The method of claim 5 wherein said process parameter values for said activation step (c) are: $T_{ch}$ is 200° C.; $\tau_{ch}$ is 120 minutes; $T_d$ is 750° C.; and $\tau_d$ is 12 minutes; and wherein said chemisorption-desorption subset of steps i) and ii) is repeated through at least 5 cycles.

7. The method of claim 1 wherein said activation step (c) produces a carbon burn-off in the range 2 percent to 30 percent by weight.

8. The method of claim 1 wherein said heat-treatment step (d) is effected at a temperature of about 900° C. to about 1,500° C.

9. The method of claim 8 wherein said sorbent material is maintained at said temperature of heat treatment in said step (d) for a period of about 0.25 minutes to 4 hours.

10. The method of claim 1 wherein said reducing gas consists of a mixture of about 2 percent hydrogen and about 98 percent inert gas, by volume.

11. The method of claim 10 wherein said contact of said surface with said reducing gas is effected at about 750° C. for about four hours.

12. The method of claim 11 wherein said surface-conditioning step (e) comprises a preliminary thermal surface cleaning, effected by heating said surface to a temperature of about 700° C. to 1,100° C. in an inert atmosphere, and wherein said surface is contacted with said reducing gas subsequent to said surface cleaning.

13. The method of claim 1 wherein said carbonization step (b) is effected under heating rate conditions sufficiently low as to avoid such levels of gas evolution and foaming that would cause significant mechanical damage to the sorbent produced.

14. The method of claim 13 wherein said sorbent precursor material is of shaped monolithic form.

15. The method of claim 1 wherein said reducing gas used for said surface conditioning is selected from the group consisting of hydrogen and carbon monoxide.

16. A method for the production of carbon-based sorbents for gas storage, comprising the following steps, carried out in the order set forth:
   a) providing a sorbent precursor material that is subject to carbonization and activation;
   b) effecting carbonization of said sorbent precursor material by heat-treatment in a non-oxidizing atmospheres;
   c) effecting activation of the carbonized sorbent precursor material using any suitable method; and
   d) effecting heat-treatment of said carbonized sorbent precursor material at a temperature in the range of about 800° C. to about 2,000° C.

17. The method of claim 16 wherein said heat-treatment step (d) is effected at a temperature of about 900° C. to about 1,500° C.

18. The method of claim 17 wherein said sorbent material is maintained at said temperature of heat treatment in said step (d) for a period of about 0.25 minutes to 4 hours.

19. A method for the production of carbon-based sorbents for gas storage, comprising the following steps, carried out in the order set forth:
   a) providing a sorbent precursor material that is subject to carbonization and activation;
   b) effecting carbonization of said sorbent precursor material by heat-treatment in a non-oxidizing atmosphere;
   c) effecting activation of the carbonized sorbent precursor material using any suitable method; and
   d) conditioning a surface of said heat-treated sorbent precursor material by contacting said surface with a reducing gas.

20. The method of claim 19 wherein said surface-conditioning step (d) comprises a preliminary thermal surface cleaning, effected by heating said surface to a temperature of about 700° C. to 1,100° C. in an inert atmosphere, and wherein said surface is contacted with said reducing gas subsequent to said surface cleaning.

21. A gas sorbent product obtained by the method of claim 1.

22. The gas sorbent product of claim 21 wherein said sorbent precursor material is of shaped monolithic form.

23. A method for storing a gas, comprising:
   A. carrying out the steps of claim 1;
   B. cooling said sorbent produced;
   C. introducing said sorbent produced into a container; and
   D. injecting a gas into said container containing said sorbent.

24. The method of claim 23 wherein said gas is selected from the group consisting of hydrogen, methane, boron trifluoride, phosphine, and arsine.

25. A method for the production of carbon-based sorbents for gas storage, comprising the following steps, carried out in the order set forth:
(a) providing a sorbent precursor material that is subject to carbonization;
(b) effecting carbonization of said sorbent precursor material by heat-treatment in a non-oxidizing atmosphere;
(c) effecting heat-treatment of said carbonized sorbent precursor material at a temperature in the range of about 800° C. to about 2,000° C.; and
(d) conditioning a surface of said heat-treated sorbent precursor material by contacting said surface with a reducing gas.

26. The method of claim 25 wherein, in said carbonization step (b), said sorbent material is heated to at least one desired temperature above 100° C. at a heating rate that is greater than zero and less than 5° C./minute, and optionally holding said material at said desired temperature for a period of at least 30 minutes.

* * * * *